Aug. 1, 1967     G. H. KLUN     3,333,404

FILTER ASSEMBLY

Original Filed July 9, 1964

INVENTOR.
GODFREY H. KLUN

BY

ATTORNEY

United States Patent Office 3,333,404
Patented Aug. 1, 1967

3,333,404
FILTER ASSEMBLY
Godfrey H. Klun, Parma, Ohio, assignor to Union Carbide Corporation, a corporation of New York
Continuation of application Ser. No. 381,365, July 9, 1964. This application Sept. 6, 1966, Ser. No. 577,536
4 Claims. (Cl. 55—492)

This application is a continuation of my application Ser. No. 381,365, filed July 9, 1964 now abandoned.

This invention is directed to a gas filter assembly and more specifically to a permanent washable filter assembly.

Air filters for hot air furnaces, air conditioners, air purifiers and other similar devices are generally characterized as either disposable or permanent. Disposable filters generally employ a glass fiber filter material which is supported by a frame. Generally, the fibers are coated with an oily substance for the purpose of trapping fine dust particles. While filters of this type can be cleaned by vacuum cleaning or by washing in water, the results are not entirely satisfactory. Vacuum cleaning is generally unsatisfactory for the removal of dust and dirt particles trapped in the body of the filter media, while water cleaning is detrimental to the oil coating. In addition, the glass fibers when broken, cut and penetrate the skin of the person doing the cleaning, thereby making the cleaning of such filters an unpleasant and hazardous task.

Permanent filters are generally constructed of aluminum mesh, organic fibers, plastic fibers and the like. All such materials are generally subject to various disadvantages. For example, most natural fibers are subject to insect, bacterial or mold attack and therefore are not really permanent. Aluminum mesh is expensive and in addition is easily deformed and not sufficiently resilient to compensate for deformation. Such materials will not withstand compression during shipment and storage or careless handling during cleaning.

Heretofore, many filter assemblies have been proposed for use with both supported filter media and self-supporting filter media. A supported filter media is generally held in place by means of a screen or other retaining means which extends across the face of the filter media. Self-supporting filter media are usually held in place by means of flanges which overlap the face of the filter media, or by means of springs and latches. Such holding means are generally expensive to fabricate, and present wearing problems, such as loss of tension.

It is therefore an object of the present invention to provide a permanent air filter which employs a minimum of materials and parts and is easy to fabricate.

It is another object of the invention to provide a permanent filter assembly which does not employ springs, latches or other moving parts and which can be easily and efficiently cleaned by means of washing with water.

These and other related objects are achieved by the permanent filter of the invention which comprises two or more gas permeable sheets of a fibrous filter material and a frame secured within the outer edges of the filter material. This type of filter construction is conveniently referred to as an internal frame construction.

Figure 1:
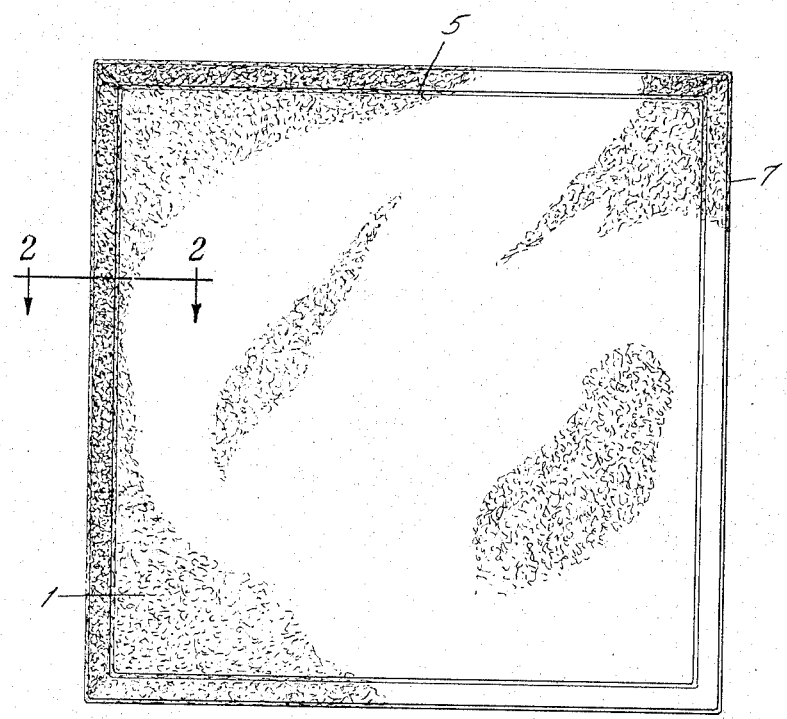
FIG. 1 is a plan view of one embodiment of the invention.

Referring now to the drawing there is shown an air filter embodying the invention which comprises a filter media 1 comprising two sheets of a fibrous heat sealable material, a hollow frame 3, of triangular cross-section which is heat sealed within the outer edges of the filter material by an inner heat seal 5 and an outer heat seal 7.

The hollow frame can be constructed of any suitable rigid, water resistant material such as plastic, metal, water resistant paper and the like. An inexpensive and highly satisfactory material is asphalt impregnated paper. Such paper can be easily formed into a frame having any desired shape. A hollow frame is preferred as providing maximum rigidity with minimum usage of material. Such hollow frames are light weight and yet stiff enough to permit normal use of the filter. It is apparent that a solid frame could be employed in the internal frame construction disclosed herein.

Figure 2:
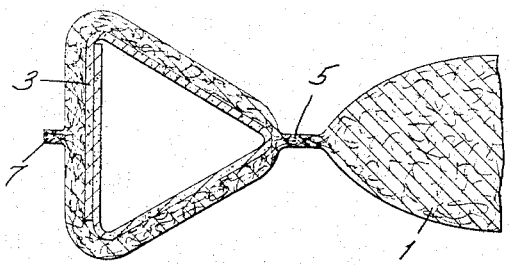
FIG. 2 is a cross-sectional view taken through line 2—2 of FIG. 1.

The cross-section of the frame can be circular, rectangular, or of triangular cross-section having a flat side facing the outer edge of the filter media. It is apparent that the satisfactory performance of the filter requires that the material of construction and the design of the frame cooperate to provide a structural support for the sheets of filter material with a substantial degree of stiffness. A preferred frame is one having a triangular cross-section and having a flat side facing the outer edge of the filter material as shown in FIG. 2. Such a frame combines a satisfactory degree of stiffness with economy as to the amount of material needed to construct the frame. Moreover, a frame of triangular cross-section can be easily formed in frames having sharp angle bends such as are found in the conventional rectangular air filters.

The filter media is preferably of non-matted, uncompressed fibers which are randomly arranged in all dimensions. The fibers may be easily held against matting and compression by a flexible adhesive with the result that the sheet of filter material has substantial softness, resilience and loft. The fibers themselves may be natural or synthetic fibers e.g., hogs' hair, nylon, rayon, acrylic fiber, or the like and other similar fibers such as are disclosed in United States Patent 2,784,132 to Maisel. Heat sealable fibers are preferred and dielectrically heat sealable materials are highly preferred.

The air filters of the invention can be prepared by providing two sheets of the filter material and a frame which has peripheral dimensions slightly less than those of the sheets. The frame is then placed on top of one of the sheets and the other sheet is positioned over the frame. The sheets are then joined together in such a manner as to enclose the frame within the outer edges of the sheets. The sheets may be joined by stitching, gluing, stapling, heat sealing or by any other convenient method. The sheets may be joined by sealing at the outer edges only, or a double seal, having one seal at the outer edges and one within the framed area, can be used. The double seal as illustrated in the drawing is preferred since it adds rigidity to the frame and also serves to hold the frame in proper relation to the filter in the event there is a crack or break in the frame. If only an outer seal was employed, failure of any adhesive used to join the section of the frame could result in causing the frame to slip or fall into the center of the filter.

The outer seal 7 can be constructed so as to provide a compressible fringe of filter material around the periphery of the filter which functions as a peripheral seal when the filter is in use. The advantage of this seal or ridge is that when the filter is inserted into a support the ridge compresses against the support or against an adjacent filter and seals the filter and any adjacent body or structure, thus providing for filtering of any air which passes around the filter rather than through the filter.

While the invention has been described with respect to the particular embodiments herein disclosed many modifications are possible within the scope of the invention. For example, a single sheet of filter material can be used, by folding the outer edge over the frame so as to envelope the frame and then joining the edge to the sheet in a manner which can be described as hemming. The joint is then in the position occupied by the inner seal illustrated in the drawing. It is also possible to use more than two sheets of filter material. For example, the central portion of the filter can be filled with inserts of additional filter material which are retained in position by the outer sheets. Moreover, the stiffness of the filter can be enhanced by providing a suitable stiffening member such as a screen or struts of wire or plastic. Such stiffening members can be positioned within the body of the filter material prior to sealing or can be positioned across the face of the filter itself so as to minimize bulging of the filter when a stream of air is passing through the filter.

I claim:

1. An air filter comprising two sheets of gas permeable, heat sealable fibrous material and a stiff hollow peripheral frame disposed adjacent the outer marginal edge portion of said air filter and enclosed and enveloped by said sheets, heat seals joining said two sheets together and extending uninterruptedly along the inner and outer peripheral portion of said frame holding said frame in a fixed internally disposed position, and the outwardly extending outer heat seal serving as a compressible peripheral seal for said air filter when said air filter is mounted in a structure.

2. An air filter comprising two sheets of gas permeable, heat sealable fibrous material, a hollow, stiff internal frame of triangular cross-section positioned and secured between and about the periphery of said sheets by an inner and an outer heat seal; said outer heat seal extending outwardly along the periphery of the filter and serving as a compressible peripheral seal for said air filter.

3. The filter of claim 2, wherein the frame is constructed of a waterproofed paper.

4. The filter of claim 2, wherein the frame is constructed of asphalt impregnated paper.

References Cited

UNITED STATES PATENTS

| | | | |
|---|---|---|---|
| 2,426,405 | 8/1947 | McDermott. | |
| 2,521,984 | 9/1950 | Lang | 55—486 |
| 2,557,279 | 6/1951 | Greenberg | 55—515 |
| 2,576,310 | 11/1951 | Ruemelin | 55—377 |
| 2,576,864 | 11/1951 | Valente | 210—491 |
| 2,965,197 | 12/1960 | Dow et al. | |
| 3,003,581 | 10/1961 | Greason | 55—514 |
| 3,017,698 | 1/1962 | Hambrecht et al. | |
| 3,082,587 | 3/1963 | Brimberg | 55—495 |

HARRY B. THORNTON, *Primary Examiner.*

S. SOKOLOFF, *Assistant Examiner.*